US012067391B2

(12) United States Patent
Okamoto et al.

(10) Patent No.: US 12,067,391 B2
(45) Date of Patent: Aug. 20, 2024

(54) MASTER DEVICE, DATA DISTRIBUTION SYSTEM, AND NON-TRANSITORY COMPUTER READABLE STORAGE MEDIUM

(71) Applicant: DENSO CORPORATION, Kariya (JP)

(72) Inventors: Shoma Okamoto, Kariya (JP); Kazuhiro Uehara, Kariya (JP); Yuzo Harata, Kariya (JP)

(73) Assignee: DENSO CORPORATION, Kariya (JP)

( * ) Notice: Subject to any disclaimer, the term of this patent is extended or adjusted under 35 U.S.C. 154(b) by 63 days.

(21) Appl. No.: 17/875,183

(22) Filed: Jul. 27, 2022

(65) Prior Publication Data
US 2022/0365772 A1 Nov. 17, 2022

Related U.S. Application Data

(63) Continuation of application No. PCT/JP2021/003526, filed on Feb. 1, 2021.

(30) Foreign Application Priority Data

Feb. 19, 2020 (JP) ................................ 2020-026298

(51) Int. Cl.
*G06F 8/65* (2018.01)
*B60R 16/023* (2006.01)
(Continued)

(52) U.S. Cl.
CPC ............ *G06F 8/656* (2018.02); *B60R 16/023* (2013.01); *G06F 8/433* (2013.01); *G06F 8/61* (2013.01); *G06F 8/65* (2013.01); *H04W 4/48* (2018.02)

(58) Field of Classification Search
CPC ... G06F 8/656; G06F 8/61; G06F 8/65; G06F 8/433; G06F 16/23; B60R 16/023; H04W 4/48
See application file for complete search history.

(56) References Cited

U.S. PATENT DOCUMENTS

2008/0262721 A1 10/2008 Guo et al.
2009/0271804 A1* 10/2009 Nagano .............. G05B 19/0426
719/318
(Continued)

FOREIGN PATENT DOCUMENTS

JP 2008051612 A 3/2008
JP 2008267875 A 11/2008
(Continued)

OTHER PUBLICATIONS

Byungjoo Kim et al., ECU Software Updating Scenario Using OTA Technology through Mobile Communication Network, 2018 IEEE, [Retrieved on Nov. 3, 2024]. Retrieved from the internet: <URL: https://ieeexplore.ieee.org/stamp/stamp.jsp?arnumber=8645019> 8 pp. 67-72 (Year: 2018).*

*Primary Examiner* — Anibal Rivera
(74) *Attorney, Agent, or Firm* — Harness, Dickey & Pierce, P.L.C.

(57) ABSTRACT

A first package corresponding to a first system and a second package corresponding to a second system are downloaded from a center device, and an update data is extracted from the first package and the second package. An electronic control device as a write target installs the update data and activates the update data after an install of the update data is completed. All electronic control devices as a first write target corresponding to the first system and all electronic control devices as a second write target corresponding to the second system are instructed at a same timing to activate the update data after completing the install of the update data in all the electronic control devices.

15 Claims, 14 Drawing Sheets

(51) Int. Cl.
    *G06F 8/41*     (2018.01)
    *G06F 8/656*     (2018.01)
    *G06F 9/44*     (2018.01)
    *H04W 4/44*     (2018.01)
    *G06F 8/61*     (2018.01)
    *H04W 4/48*     (2018.01)

(56) References Cited

U.S. PATENT DOCUMENTS

| | | | |
|---|---|---|---|
| 2012/0124571 A1* | 5/2012 | Nagai | G06F 11/1433 |
| | | | 701/29.1 |
| 2018/0018160 A1* | 1/2018 | Teraoka | G06F 9/445 |
| 2019/0111907 A1 | 4/2019 | Harata et al. | |
| 2019/0220265 A1* | 7/2019 | Willis | H04W 76/10 |
| 2021/0026617 A1* | 1/2021 | Maru | G06F 8/65 |
| 2021/0132937 A1* | 5/2021 | Ishikawa | G06F 8/65 |
| 2021/0157902 A1 | 5/2021 | Sakurai et al. | |
| 2021/0191661 A1 | 6/2021 | Harata et al. | |
| 2021/0201599 A1* | 7/2021 | Shionoya | G07C 5/0841 |
| 2022/0405085 A1* | 12/2022 | Abadie | G06F 8/65 |

FOREIGN PATENT DOCUMENTS

| | | |
|---|---|---|
| JP | 2011238154 A | 11/2011 |
| JP | 2016224898 A | 12/2016 |
| JP | 2018510373 A | 4/2018 |
| JP | 2019057324 A | 4/2019 |
| JP | 2020027640 A | 2/2020 |
| WO | WO-2016130719 A2 | 8/2016 |
| WO | WO-2020032196 A1 | 2/2020 |

\* cited by examiner

FIG. 10

| | WRITE TARGET ECU (A) | WRITE TARGET ECU (B) | WRITE TARGET ECU (C) | WRITE TARGET ECU (D) | WRITE TARGET ECU (E) | WRITE TARGET ECU (F) |
|---|---|---|---|---|---|---|
| SYSTEM (1) | Ver 1.0 →Ver 1.1 | Ver 1.0 →Ver 1.1 | Ver 1.0 →Ver 1.1 | — | — | — |
| SYSTEM (2) | — | — | — | Ver 2.0 →Ver 2.1 | Ver 2.0 →Ver 2.1 | Ver 2.0 →Ver 2.1 |

UPGRADE VERSION AT THE SAME TIME

FIG. 13

| | WRITE TARGET ECU (A) | WRITE TARGET ECU (B) | WRITE TARGET ECU (C) | WRITE TARGET ECU (D) | WRITE TARGET ECU (E) | WRITE TARGET ECU (F) |
|---|---|---|---|---|---|---|
| SYSTEM (X) | Ver 1.0 →Ver 1.1 | Ver 1.0 →Ver 1.1 | Ver 1.0 (Ver 1.1) →Ver 1.2 | Ver 1.1 →Ver 1.2 | — | — |
| SYSTEM (3) | — | — | — | — | Ver 2.0 →Ver 2.1 | Ver 2.0 →Ver 2.1 |

UPGRADE VERSION AT THE SAME TIME (columns E and F)

MASTER DEVICE, DATA DISTRIBUTION SYSTEM, AND NON-TRANSITORY COMPUTER READABLE STORAGE MEDIUM

CROSS REFERENCE TO RELATED APPLICATION

The present application is a continuation application of International Patent Application No. PCT/JP2021/003526 filed on Feb. 1, 2021, which designated the U.S. and claims the benefit of priority from Japanese Patent Application No. 2020-026298 filed on Feb. 19, 2020. The entire disclosures of all of the above applications are incorporated herein by reference.

TECHNICAL FIELD

The present disclosure relates to a master device, a data distribution system and a non-transitory computer readable storage medium.

BACKGROUND

In recent years, the scale of a program for vehicle control, diagnosis, and the like, installed in an electronic control device (hereinafter, referred to as an electronic control unit (ECU)) of a vehicle, has been increased due to the diversification of vehicle control such as a driving support function and an autonomous driving function. An opportunity to rewrite (i.e., reprogram) a program of an ECU has been increased in accordance with upgrading based on functional improvement. On the other hand, a technique for connected cars has also spreads together with the progress of communication networks or the like. Under such circumstances, for example, in a conceivable technique, a master device as a relay device is provided on the vehicle side, and the update data downloaded from the center device by the master device is transferred to the write target ECU, so that the program for the write target ECU is updated by OTA (Over The Air), and such a technique has been proposed.

SUMMARY

According to an example, a first package corresponding to a first system and a second package corresponding to a second system are downloaded from a center device, and an update data is extracted from the first package and the second package. An electronic control device as a write target installs the update data and activates the update data after an install of the update data is completed. All electronic control devices as a first write target corresponding to the first system and all electronic control devices as a second write target corresponding to the second system are instructed at a same timing to activate the update data after completing the install of the update data in all the electronic control devices.

BRIEF DESCRIPTION OF THE DRAWINGS

The above and other objects, features and advantages of the present disclosure will become more apparent from the below-described detailed description made with reference to the accompanying drawings. In the drawings:

FIG. 10 is a diagram (No. 1) showing an aspect of being upgraded;

FIG. 13 is a diagram (No. 2) showing an aspect of being upgraded;

DETAILED DESCRIPTION

Figure 1:
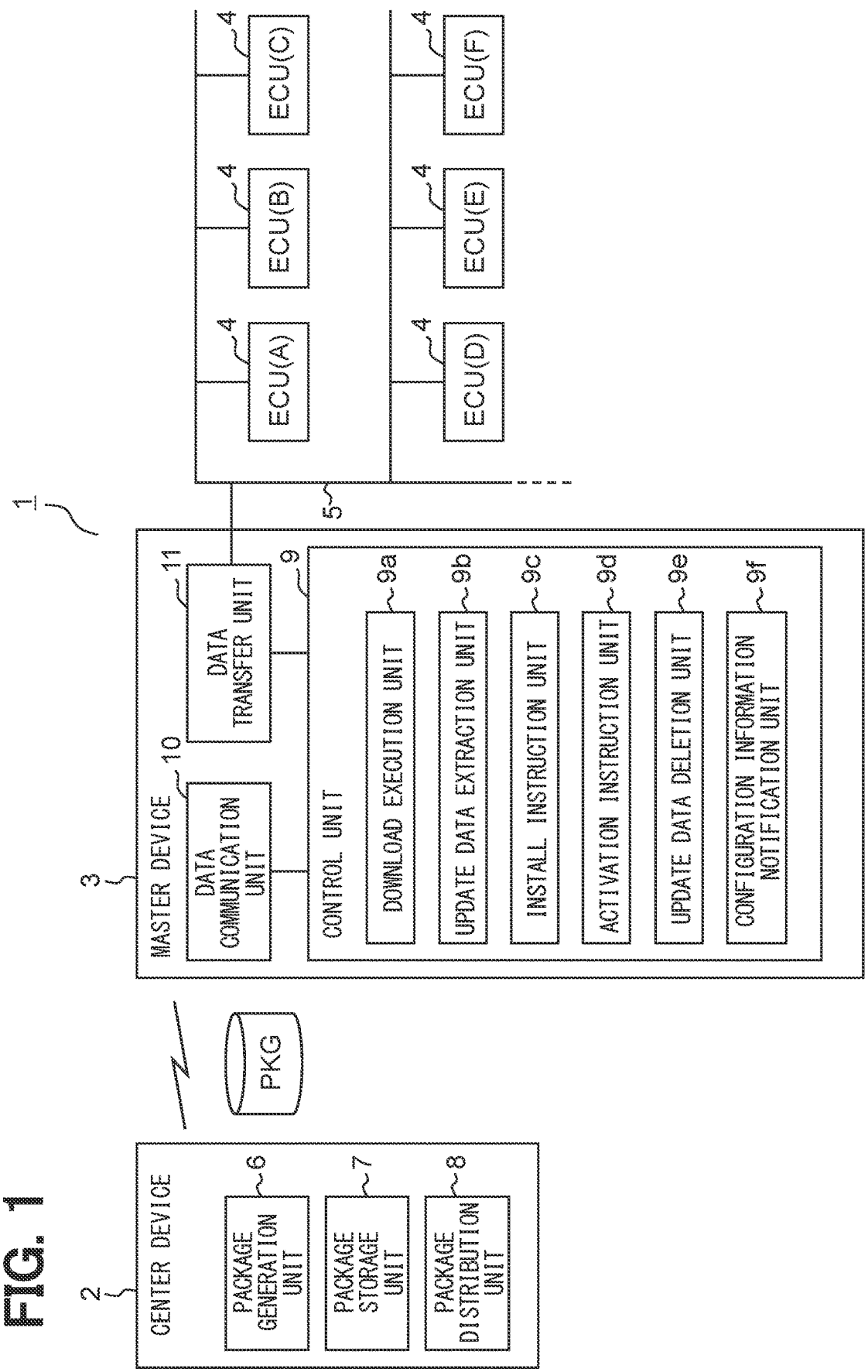
FIG. 1 is a diagram showing an entire system configuration according to a first embodiment.

In the technique of updating the program, there may occur a situation in which the vehicle cannot be operated in the process of updating the program for the write target ECU after the package is downloaded from the center device to the master device. It is desired to reduce such a situation that is inconvenient for the user as much as possible.

The present embodiments provide to appropriately reduce a situation in which the vehicle cannot be operated.

According to one aspect of the present embodiments, the download execution unit downloads the first package corresponding to the first system and the second package corresponding to the second system from the center device. When the first package and the second package are downloaded by the download execution unit, the update data extraction unit extracts update data from the first package and the second package. When the update data is extracted by the update data extraction unit, the installation instruction unit instructs the electronic control device as a write target to install the extracted update data. The activation instruction unit instructs the electronic control device as a write target to activate the update data after the installation of the update data is completed in the electronic control device as a write target. The activation instruction unit instructs all the electronic control devices as the first write target and all the electronic control devices as the second write target at the same timing to activate the update data after completing the installation of the update data in all the electronic control devices of the first write target corresponding to the first system and all the electronic control devices of the second write target corresponding to the second system.

When instructing all the electronic control devices as the first write target and all the electronic control devices as the second write target to activate the update data at different timings, and then, updating the first system and the second system at different timings, a situation may occur in which the vehicle cannot be operated each time. However, when instructing the activation of the update data at the same timing, and then, updating the first system and the second system at the same timing, it is possible to reduce appropriately a situation in which the vehicle cannot be operated.

Hereinafter, one embodiment will be described with reference to the drawings. The data distribution system 1 is a vehicular electronic control system including a center device 2, a master device 3 mounted on the vehicle, and an electronic control device (hereinafter referred to as an ECU (i.e., Electronic Control Unit)) 4. Further, it is a system that can rewrite application programs such as vehicle control and diagnosis implemented in the ECU 4. In this embodiment, a case where the ECU 4 writes a repro program as update data in the memory to rewrite the application program is described, alternatively, the embodiment may provide a case where, for example, a control parameter used by the ECU 4 or an application data used in an application such as a map data in an map application is rewritten. That is, the update data is a repro program, a control parameter, application data, and the like. The write target ECU 4 as a writing target of the update data is, for example, each ECU 4 that controls the vehicle body system, each ECU 4 that controls the traveling system, each ECU 4 that controls the multimedia system, and the like.

The master device 3 and the plurality of ECUs 4 are connected to each other via a bus 5. The bus 5 corresponds to, for example, CAN (controller area network, registered trademark), LIN (local interconnect network, registered trademark), CXPI (clock extension peripheral interface, registered trademark), FlexRay (registered trademark), MOST (media oriented systems transport, registered trademark), or the like. These buses have different communication protocols and different communication speeds and different signal formats.

The center device 2 has a package generation unit 6, a package storage unit 7, and a package distribution unit 8. When the update data is registered, the package generation unit 6 packages the registered update data to generate a package, and stores the generated package in the package storage unit 7. The package distribution unit 8 reads the package stored in the package storage unit 7, and wirelessly connects to the master device 3 via a wide area communication line such as a 3G line or a 4G line, thereby distributing the read package from a package distribution unit 8 to the master device 3.

The master device 3 has a memory having a predetermined storage capacity, and when a package is downloaded from the data distribution device 2, the downloaded package is temporarily stored in the memory. When the installable condition for the write target ECU 4 to be described later is satisfied, the master device 3 reads the package stored in the memory, unpackages the read package, extracts the update data, and transfers the extracted update data to the write target ECU 4.

The master device 3 has a control unit 9, a data communication unit 10, and a data transfer unit 11. The control unit 9 is provided by a microcomputer having a CPU (Central Process Unit), a ROM (Read Only Memory), a RAM (Random Access Memory), and an I-O (Input-Output). The microcomputer executes computer programs stored in a non-transitory tangible storage medium to execute processing corresponding to the computer programs, and controls an overall operation of the center device 2. A computer program executed by a microcomputer includes an update control program. The control unit 9 has a download execution unit 9a, an update data extraction unit 9b, an install instruction unit 9c, an activation instruction unit 9d, an update data deletion unit 9e, and a configuration information notification unit 9f.

The download execution unit 9a downloads the package from the center device 2 when the package delivered from the center device 2 is received by the data communication unit 10. When the package is downloaded by the download execution unit 9a, the update data extraction unit 9b unpackages the downloaded package and extracts the update data. The package is a compressed file such as a zip file.

When the installable condition for the write target ECU 4 is satisfied, the install instruction unit 9c instructs the write target ECU 4 to install and causes the write target ECU 4 to install the update data. The installability conditions are, for example, such that the user has performed an installation consent operation, that the vehicle state is in an installable state, that the write target ECU 4 is in an installable state, that the update data is normal data, and the like. Specifically, the install instruction unit 9c determines that the vehicle state is in an installable state by, for example, determining that the remaining battery level of the in-vehicle battery is equal to or greater than a predetermined capacity or determining that the environment is not improper. The install instruction unit 9c determines that the write target ECU 4 is in an installable state by, for example, determining that the memory structure of the write target ECU 4 is normal or determining that the communication load of the bus 5 is less than a predetermined level. The install instruction unit 9c determines that the updated data is normal data, for example, by determining that the updated data is data that has not been falsified or destroyed.

Further, when the installation of the update data in the write target ECU 4 is completed, the activation instruction unit 9d instructs the write target ECU 4 to activate the installed update data as a valid data, and causes the write target ECU 4 to activate the update data. The activation condition is, for example, that the user has performed an activation consent operation, that the vehicle state is in an activation state, that the write target ECU 4 is in an activation state, and the like.

Specifically, the activation instruction unit 9d determines that the vehicle state is in an activation state by, for example, determining that the vehicle is in a parked state or determining that the remaining amount of the in-vehicle battery is equal to or greater than a predetermined capacity. The activation instruction unit 9d determines that the write target ECU 4 is in an activation state by, for example, determining that the update data written in the memory of the write target ECU 4 is normal.

When the activation of the update data in the write target ECU 4 is completed, the update data deletion unit 9e deletes the update data transferred to the write target ECU 4. When the activation of the update data is completed in the write target ECU 4, the configuration information notification unit 9f causes the data communication unit 10 to transmit the configuration information to the center device 2. When the center device 2 receives the configuration information transmitted from the master device 3, the center device 2 registers the received configuration information in the individual vehicle information database that manages the version of the system and the ECU 4 for each vehicle to match the version of the system or ECU 4 handled by the center device 2 to the actual system or version of ECU 4 on the vehicle side.

The center device 2 notifies the user of the program update campaign by distributing the campaign information to the master device 3, and the user performs the download consent operation to deliver the package in which the update data is packaged to the master device 3. The master device 3 notifies the user of information such as function addition using the campaign information, and suggests the user to select whether or not to execute the download. When the master device 3 detects that the user has performed the download consent operation, the master device 3 notifies the center device 2 of the user download consent operation. The master device 3 downloads the package distributed from the center device 2. The package delivered from the center device 2 to the master device 3 corresponds to the system. The system is an unit of control or a group of functions, for example, an accelerator control system, a brake control system, a steering control system, and the like, and includes one or more ECUs 4. In this case, when updating the program of one system, one package is included in one campaign information, while when updating the programs of multiple systems at once, one campaign information includes multiple packages. In either case, since it is defined in one campaign information, it is possible to perform not only the program update of one system but also the program update of multiple systems collectively when the user performs the one download consent operation.

Figure 2:
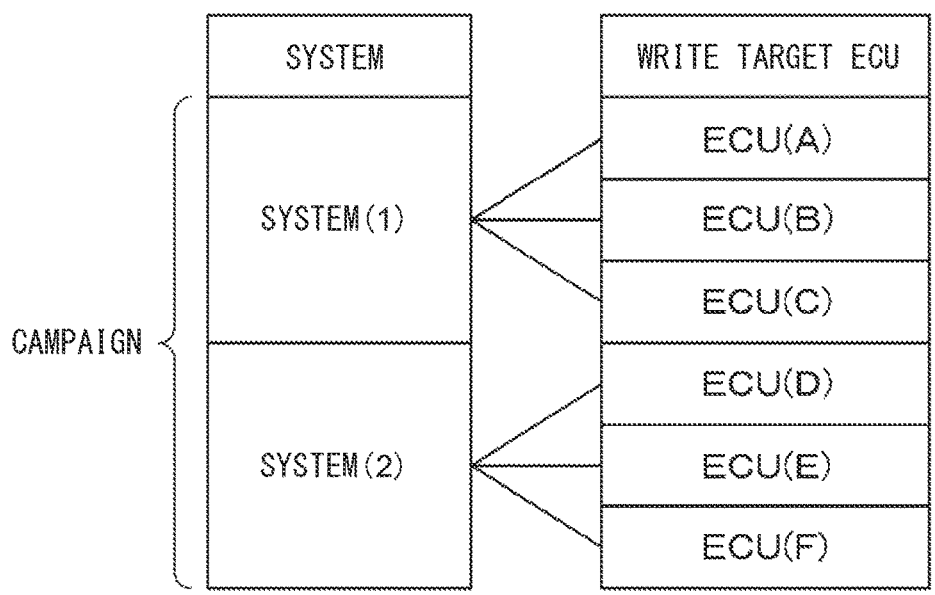
FIG. 2 is a diagram (No. 1) showing a dependency relationship between a system and a write target ECU.

The relationship between the system corresponding to the package and the write target ECU 4 will be described. When a plurality of packages are included in one campaign information, the write target ECU 4 may or may not be shared by a plurality of systems corresponding to the plurality of packages. FIG. 2 illustrates a case where none of the write target ECUs 4 is shared by a plurality of systems. The write target ECUs (A) to (C) relate to the system (1), and the write target ECUs (D) to (F) relate to the system (2). Since the system (1) and the system (2) do not share any of the write target ECUs 4, there is no dependency relationship. Since there is no dependency between the system (1) and the system (2), the write target ECUs (A) to (C) relating to the system (1) and the write target ECUs (D) to (F) relating to the system (2) can be activated independently. That is, even if only the system (1) becomes a new version and the system (2) remains the old version, there is no difficulty in vehicle control. The system (1) and the system (2) may be activated at different timings, or the system (1) and the system (2) may be activated at the same time.

Figure 3:
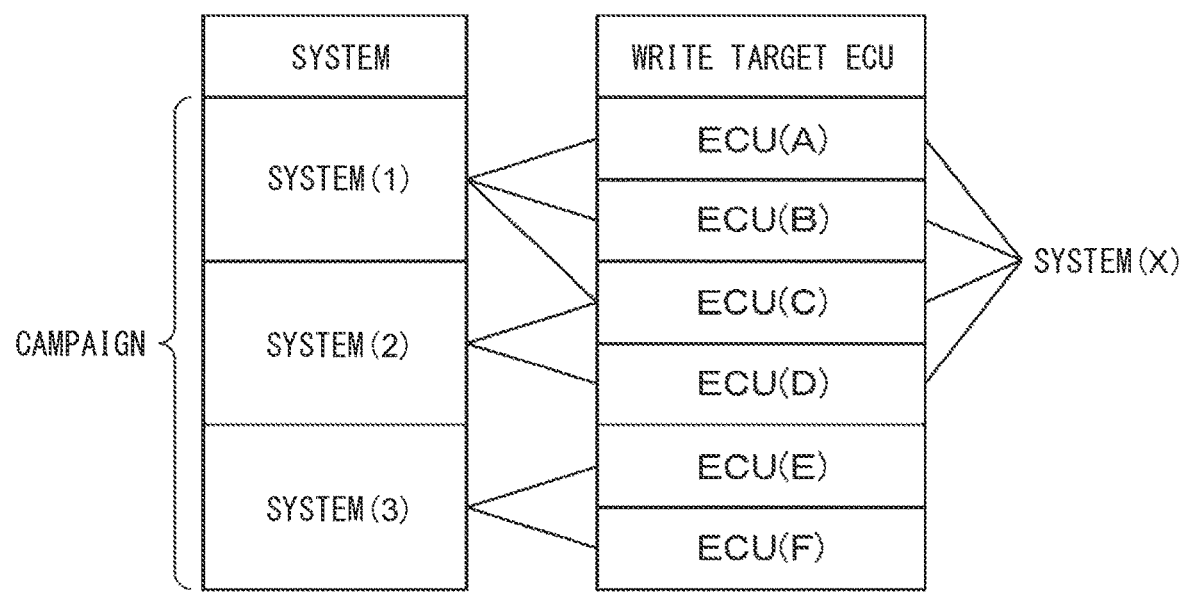
FIG. 3 is a diagram (No. 2) showing a dependency relationship between a system and a write target ECU.
Figure 4:
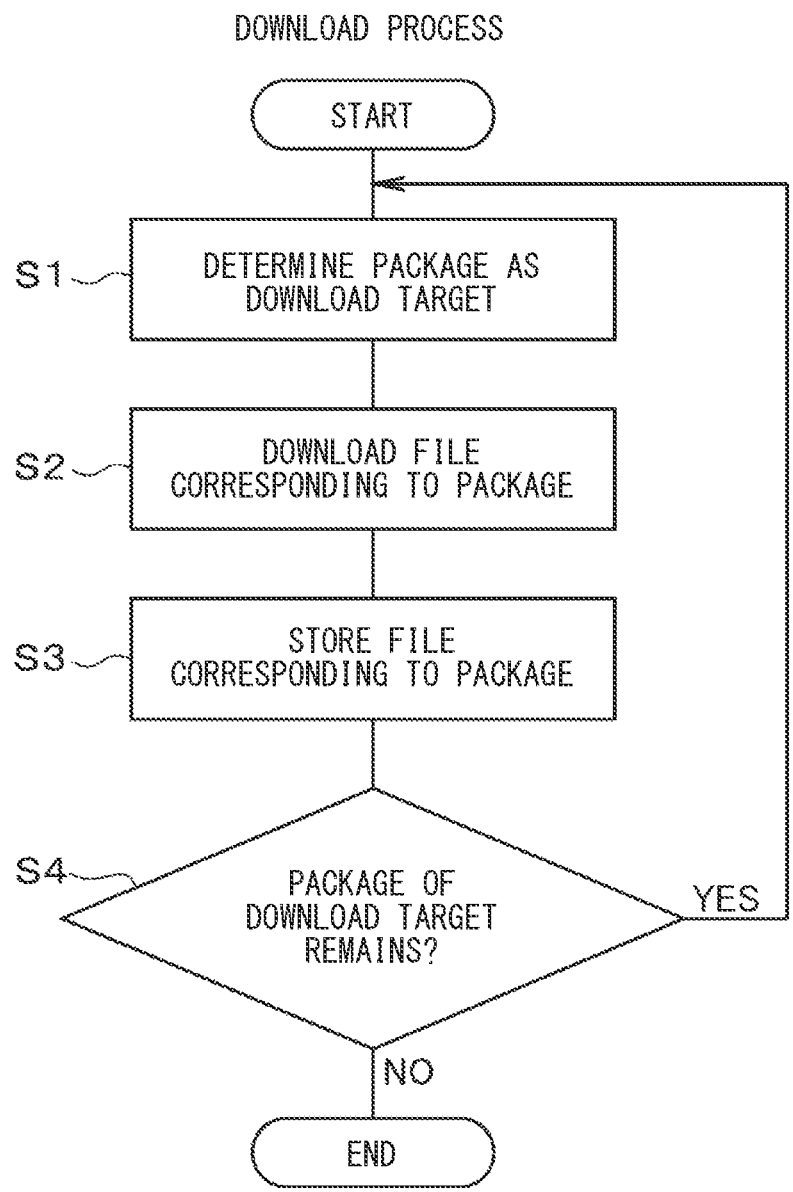
FIG. 4 is a flowchart (No. 1) showing a download process.
Figure 5:
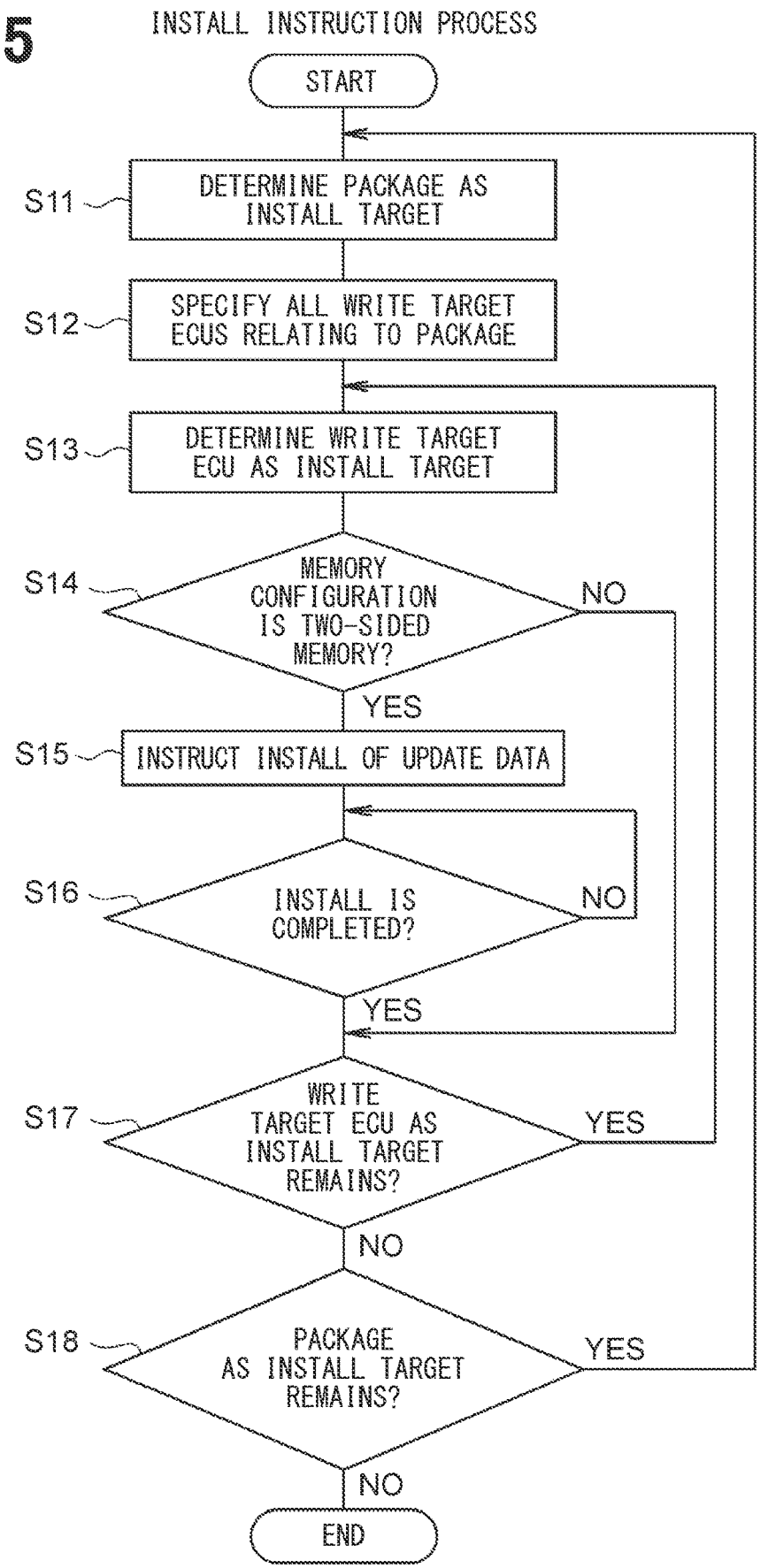
FIG. 5 is a flowchart (No. 2) showing an installation instruction process.
Figure 6:
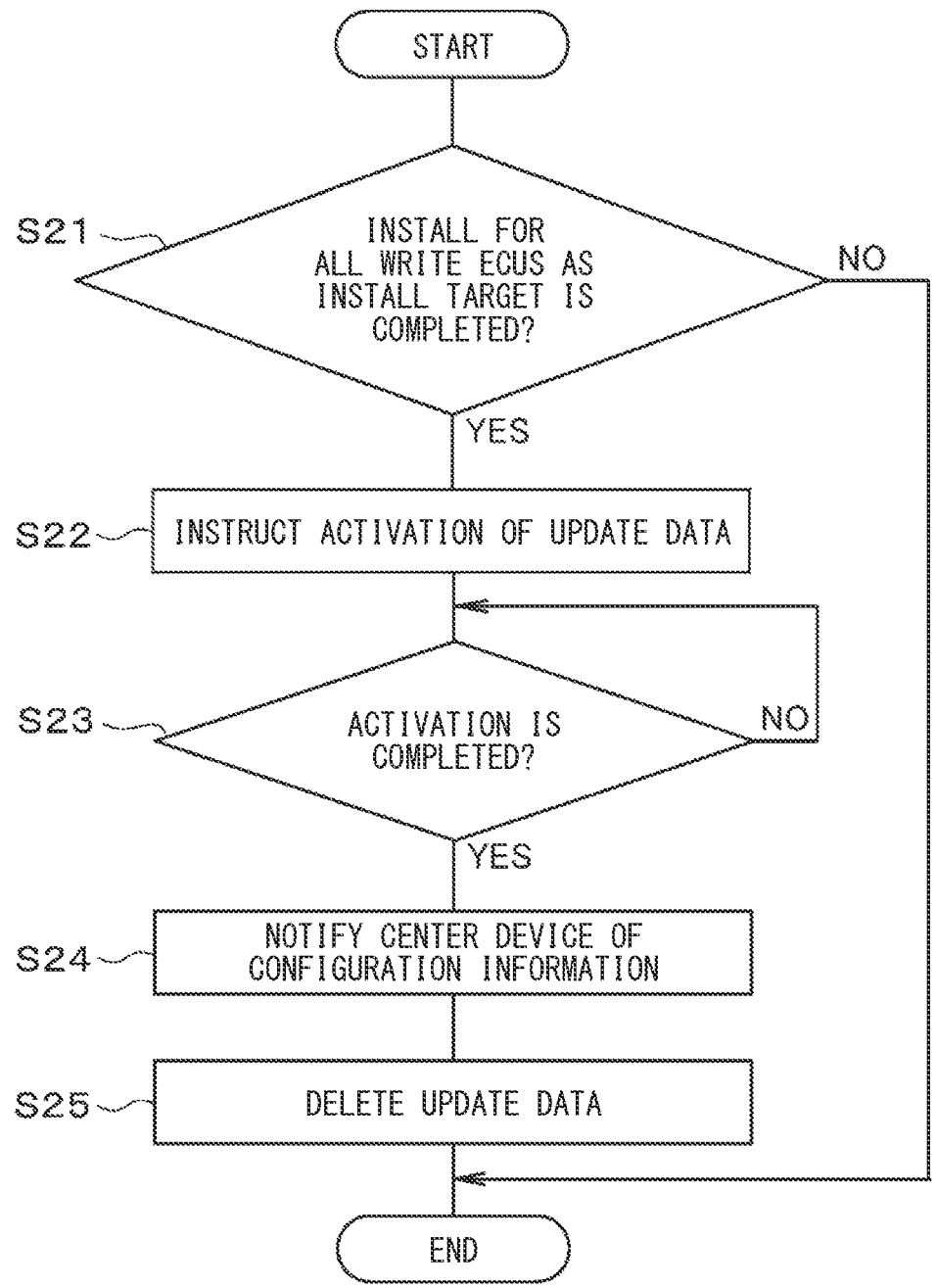
FIG. 6 is a flowchart (No. 3) showing an activation instruction process.

FIG. 3 illustrates a case where the write target ECU 4 is shared by a plurality of systems. The write target ECUs (A) to (C) relate to the system (1), the write target ECUs (C) to (D) relate to the system (2), and the write target ECUs (E) and (F) relate to the system (3). Since the system (1) and the system (3) do not share any of the write target ECUs 4, there is no dependency relationship. Since the system (2) and the system (3) do not share any of the write target ECUs 4, there is no dependency relationship. On the other hand, since the system (1) and the system (2) share the writing target ECU (C), there is a dependency relationship. In this case, since there is a dependency between the system (1) and the system (2), the write target ECUs (A) to (D) constituting the system (1) and the system (2) need to be activated at the same time, which is different from the case where there is no dependency relationship.

Therefore, the center device 2 processes the system (1) and the system (2) as one system (X), packages the update data of the write target ECUs (A) to (D), and generates the package 1. Further, the center device 2 packages the update data of the write target ECUs (E) and (F) for the system (3) having no dependency on other systems, and generates the package 2. Since there is no dependency between the system (X) and the system (3), the system (X) and the system (3) may be activated at different timings, or the system (X) and the system (3) may be activated at the same time. The center device 2 stores a table in which it is possible to specify which ECU belongs to each system, and when a system having a dependency relationship is to be updated as an update target, and the package generation unit 6 generates the package with setting a plurality of systems having the dependency relationship as one system.

In this case, the center device 2 stores the package 1 and the package 2 in the package storage unit 7. The center device 2 sets the package 1 and the package 2 as a campaign information for updating the program, reads the package 1 and the package 2 stored in the package storage unit 7, and distributes the read package 1 and the read package 2 from the package distribution unit 8 to the master device 3. The center device 2 generates a package and sets a campaign information so that the dependency does not occur in this way. The above exemplifies the case where one write target ECU 4 is shared by a plurality of systems, but the same applies to the case where there are a plurality of write target ECUs 4 shared by a plurality of systems.

In a case where one or more write target ECUs 4 are involved in one system, the software of the write target ECU 4 is upgraded and the system relating to the write target ECU 4 is also upgraded when the activation of the update data is completed in all of the write target ECUs 4 involved in the system. That is, the write target ECU 4 is upgraded for each system.

The ECU 4 has a memory for storing a control program and data. The types of memory mounted on the ECU 4 include a two-sided memory and a one-sided memory. Since the two-sided memory has substantially two sides that are the writing areas of the program, one side thereof is used as the execution side of the program and the other side is used as the rewriting side of the program. It is possible to rewrite the program on the rewriting side while executing the stored program and controlling the vehicle. That is, the ECU 4 on which the two-sided memory is mounted can install the update data not only while the vehicle is parked but also while the vehicle is running.

On the other hand, the one-sided memory has one side to be a write area of the program on one surface or on pseudo two sides, so that unlike the above-mentioned two-sided memory, one side thereof is used as the execution surface of the program but it is impossible to have the other side as the rewriting side of the program. Thus, it is impossible to rewrite the program on the rewriting side while controlling the vehicle by executing the program stored in the execution side while the vehicle is running. That is, the ECU 4 on which the one-sided memory is mounted can install the update data only while the vehicle is parked, and cannot install the update data while the vehicle is running. It should be noted that the activation for validating the written update data is executed during parking in both the ECU with the one-sided memory and the ECU with the two-sided memory.

Next, an operation of the above configuration will be described with reference to FIGS. 4 to 15. In the master device 3, the control unit 9 executes a download process for downloading a package from the center device 2 and an installation instruction process for instructing the write target ECU 4 to install update data in parallel, and performs the activation instruction process for instructing the write target ECU 4 to activate the update data when the installation instruction process ends. Hereinafter, each process will be described in sequence.

(1) Download Process

When the control unit 9 starts the download process, the control unit 9 refers to the campaign information delivered from the center device 2, determines the package to be downloaded (at S1), and transmits the download request of the determined package to the center device 2, so that the file corresponding to the determined package is downloaded from the center device 2 (at S2). When the control unit 9 downloads the file corresponding to the package from the center device 2, the control unit 9 stores the file corresponding to the downloaded package in the memory (at S3).

The control unit 9 determines whether or not the package as a download target remains (at S4), and when it is determined that the package as the download target remains, that is, all the files corresponding to the packages as the download target are not downloaded ("YES" at S4), the process returns to step S1 described above, and step S1 and subsequent steps are repeated. When the control unit 9 determines that there are no packages to be downloaded, that is, all the files corresponding to the packages as the download target have been downloaded ("NO" at S4), the control unit 9 ends the download process. When the download of the package 1 is completed, the control unit 9 may send the next download request for the package 2 to the center device 2 and start the installation instruction process of the update data corresponding to the package 1. In this case, the download of the package 2 from the center device 2 and the installation of the update data corresponding to the package 1 in the write target ECU 4 can be executed in parallel.

(2) Install Instruction Process

When the control unit 9 completes the download of the package, the control unit 9 starts the installation instruction process. Here, it is assumed that the vehicle is running. When the install instruction process is started, the control unit 9 determines a package as the install target (at S11), and specifies all write target ECUs 4 involved in the determined package (at S12). The control unit 9 determines the write target ECU 4 at the install target from all the specified write target ECUs 4 (at S13), and determines whether the memory configuration of the determined write target ECU 4 is a two-sided memory or a one-sided memory (at S14). When the control unit 9 determines that the memory configuration of the determined write target ECU 4 is a two-sided memory ("YES" at S14), the control unit 9 instructs the determined write target ECU 4 to install the update data, and instructs the determined write target ECU 4 to install the update data (at S15, which corresponds to the install instruction procedure).

When the control unit 9 receives the install completion notification from the write target ECU 4 to which the install of the update data is instructed, and the control unit 9 determines that the install is completed in the write target ECU 4 in which the install of the update data is instructed ("YES" at S16), the control unit 9 determines whether or not the write target ECU 4 as the install target remains (at S17). When the control unit 9 determines that the write target ECU 4 as the install target remains ("YES" at S17), the control unit 9 returns to step S13 described above, and repeats step S13 and subsequent steps.

When the control unit 9 determines that the write target ECU 4 as the install target does not remain ("NO" at S17), the control unit 9 determines whether or not the package as the install target remains (at S18). When the control unit 9 determines that the package as the install target remains ("YES" at S18), the control unit 9 returns to step S11 described above, and repeats step S11 and subsequent steps. When the control unit 9 determines that no package as the install target remains ("NO" at S18), the control unit 9 ends the install instruction process.

When the control unit 9 performs the install instruction process while the vehicle is traveling in this way, the control unit 9 instructs the install of the update data in the install instruction process for the write target ECU 4 whose memory configuration is the two-sided memory. But, the control unit 9 does not instruct the install of the update data in the install instruction process for the write target ECU 4 whose memory configuration is the one-sided memory. When the install instruction process is performed while the vehicle is parked, the control unit 9 instructs all the write target ECUs 4 to install the update data in the install instruction process regardless of the memory configuration.

(3) Activation Instruction Process

The control unit 9 starts the activation instruction process when the vehicle shifts from traveling to parking. The transition from a running vehicle to a parked vehicle corresponds to a change in the vehicle state to a predetermined state. When the activation instruction process is started, the control unit 9 determines whether or not the install of the update data has been completed in all the write target ECUs 4 as the install target (at S21). That is, the control unit 9 determines whether or not the install of the update data included in all the packages corresponding to the campaign information is completed. When the control unit 9 has received the install completion notification from all the write target ECUs 4 as the install target, and the control unit 9 determines that the install of the update data has been completed in all the write target ECU 4 as the install target ("YES" at S21), the control unit 9 instructs all the write target ECUs 4 for which the install of the update data has been completed to activate the update data, and causes the write target ECUs 4 to simultaneously activate the update data (at S22, corresponding to the activation instruction procedure).

When the control unit 9 receives the activation completion notification from all the write target ECUs 4 to which the activation of the update data are instructed, and determines that the activation is completed in all the write target ECUs 4 to which the activation of the update data are instructed ("YES" at S23), the control unit 9 notifies the center device 2 of the configuration information (at S24), deletes the update data (at S25), and ends the activation instruction process.

Figure 7:
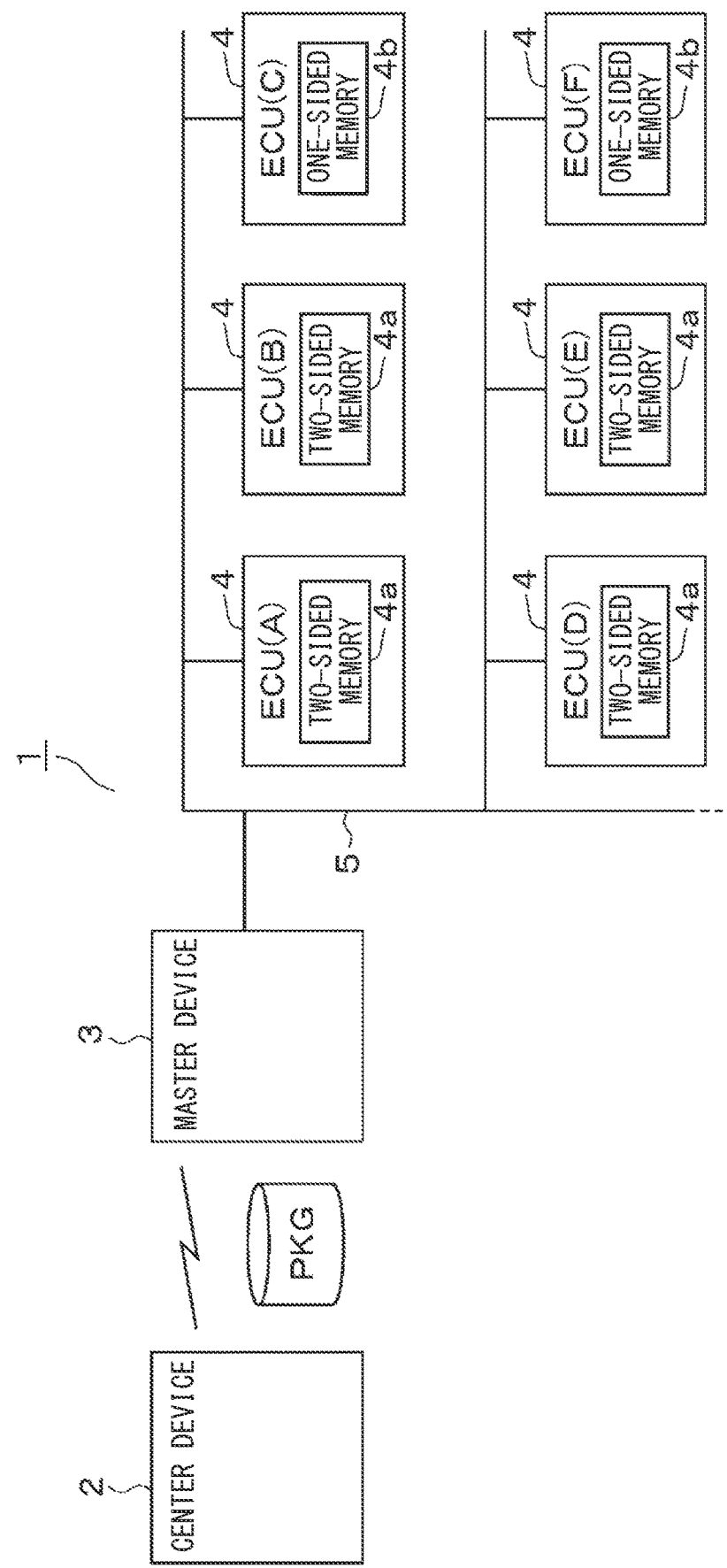
FIG. 7 is a diagram showing a memory configuration of an ECU.

Specifically, as shown in FIG. 7, a case where the write target ECUs (A), (B), (D), and (E) have a configuration in which the two-sided memory 4*a* is provided, and the write target ECUs (C), (F) have a configuration in which the one-sided memory 4*b* is provided will be described.

Figure 8:
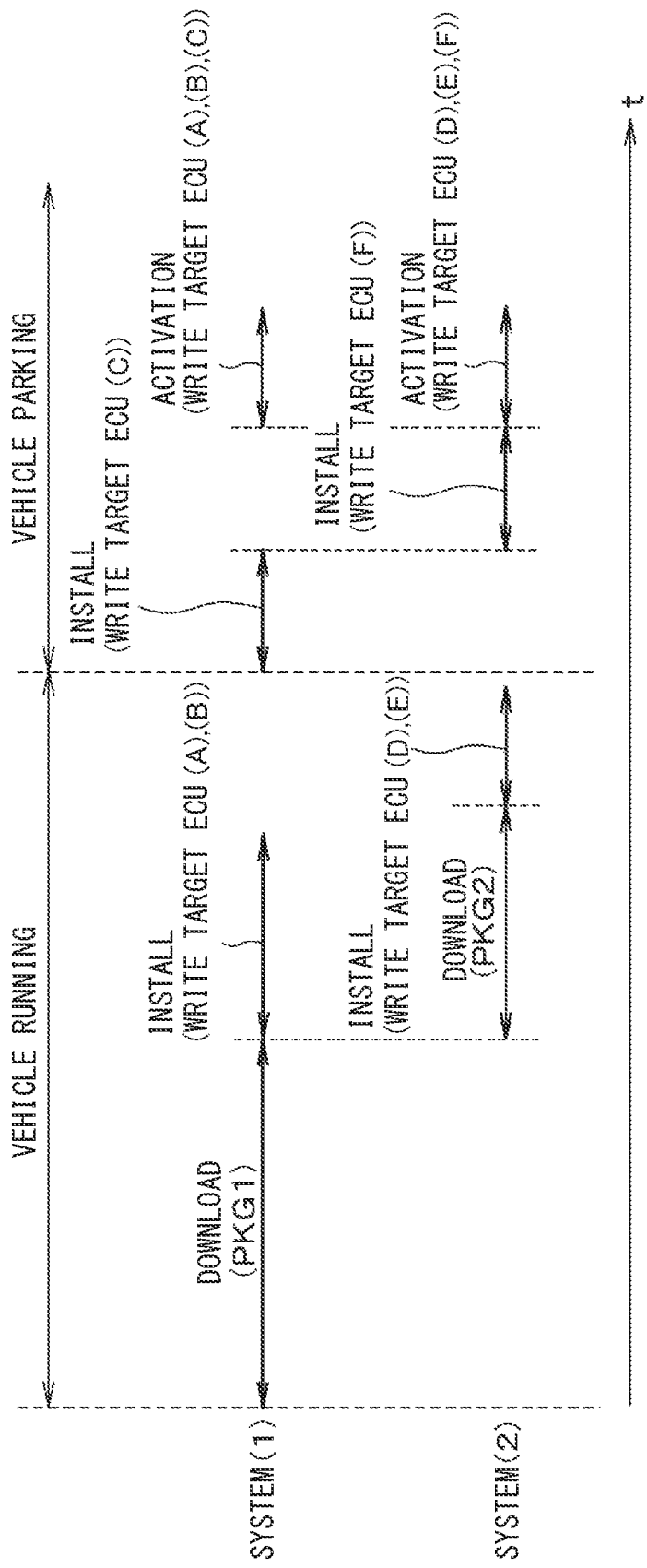
FIG. 8 is a diagram showing a timing chart (No. 1)
Figure 9:
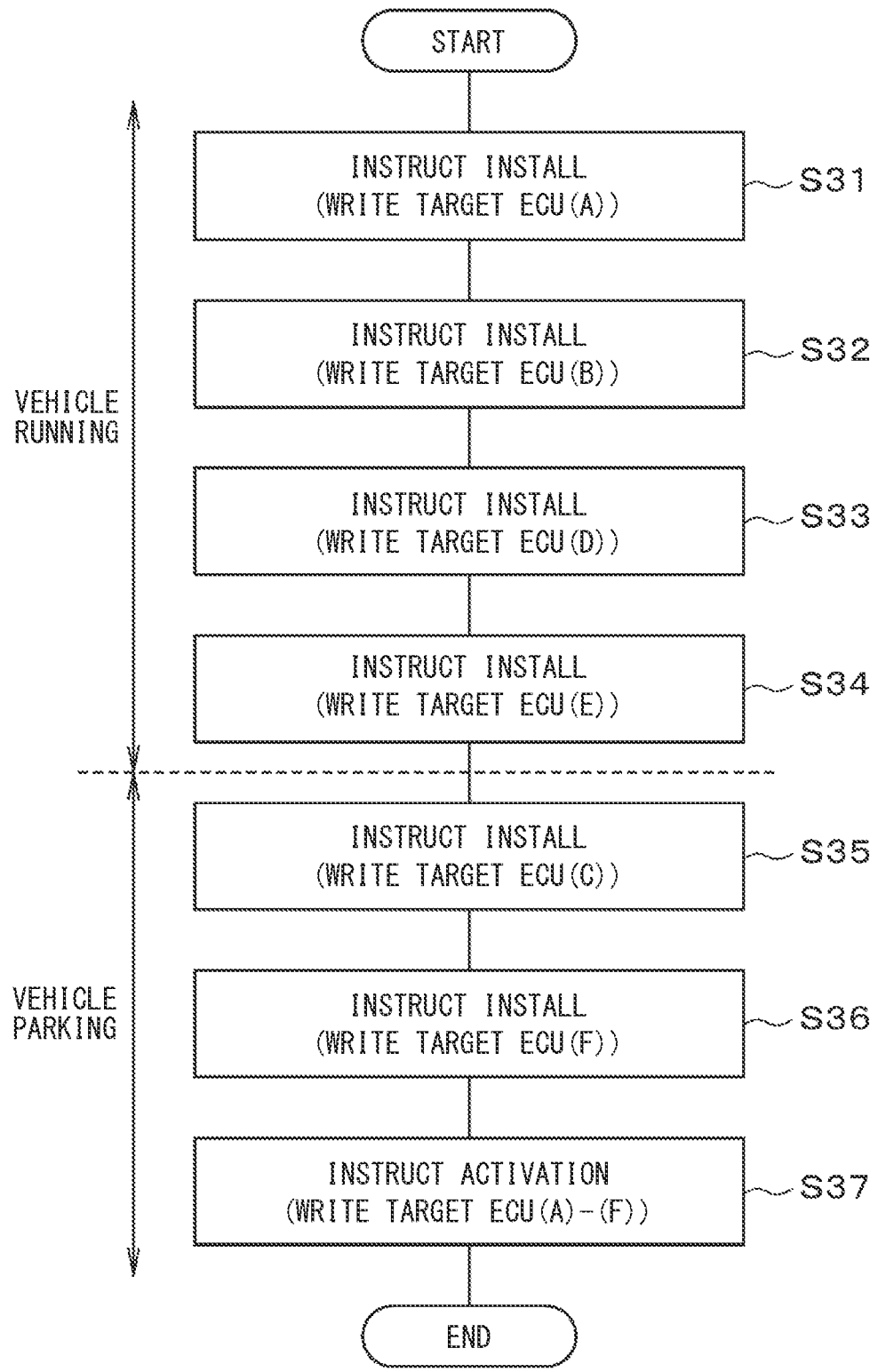
FIG. 9 is a diagram (No. 1) showing the flow of installation and activation.

When the dependency of the systems (1) and (2) corresponding to the packages downloaded from the center device 2 to the master device 3 is shown in FIG. 2, the control unit 9 firstly downloads the package 1 (PKG1) corresponding to the system (1) while the vehicle is running as shown in FIGS. 8 and 9. After that, the control unit 9 sequentially instructs the write target ECUs (A) and (B) to install the update data in parallel with downloading the package 2 (PKG2) corresponding to the system (2) (at S31 to S32). After completing the download of the package 2 corresponding to the system (2), the control unit 9 sequentially instructs the write target ECUs (D) and (E) to install the update data (at S33 to S34).

When the vehicle shifts from traveling to parking, the control unit 9 sequentially instructs the write target ECUs (C) and (F) to install the update data (at S35 to S36), and instructs the write target ECU (A) to (F) to activate the update data at the same time (at S37). That is, the control unit 9 instructs the write target ECUs (A) to (C) involved in the system (1) and the write target ECUs (D) to (F) involved in the system (2) to activate the update data at the same time. In the examples of FIGS. 8 and 9, the system (1) corresponds to the first system, the write target ECUs (A) to (C) correspond to the first write target electronic control device, and the system (2) corresponds to the second system, and the write target ECUs (D) to (F) correspond to the second write target electronic control device.

As shown in FIG. 10, for example, when the system (1) is upgraded by upgrading the software version of the write target ECUs (A) to (C) from "1.0" to "1.1", and the system (2) is upgraded by upgrading the software version of the write target ECUs (D) to (F) from "2.0" to "2.1", the system (1) and the system (2) are upgraded at the same time.

Figure 11:
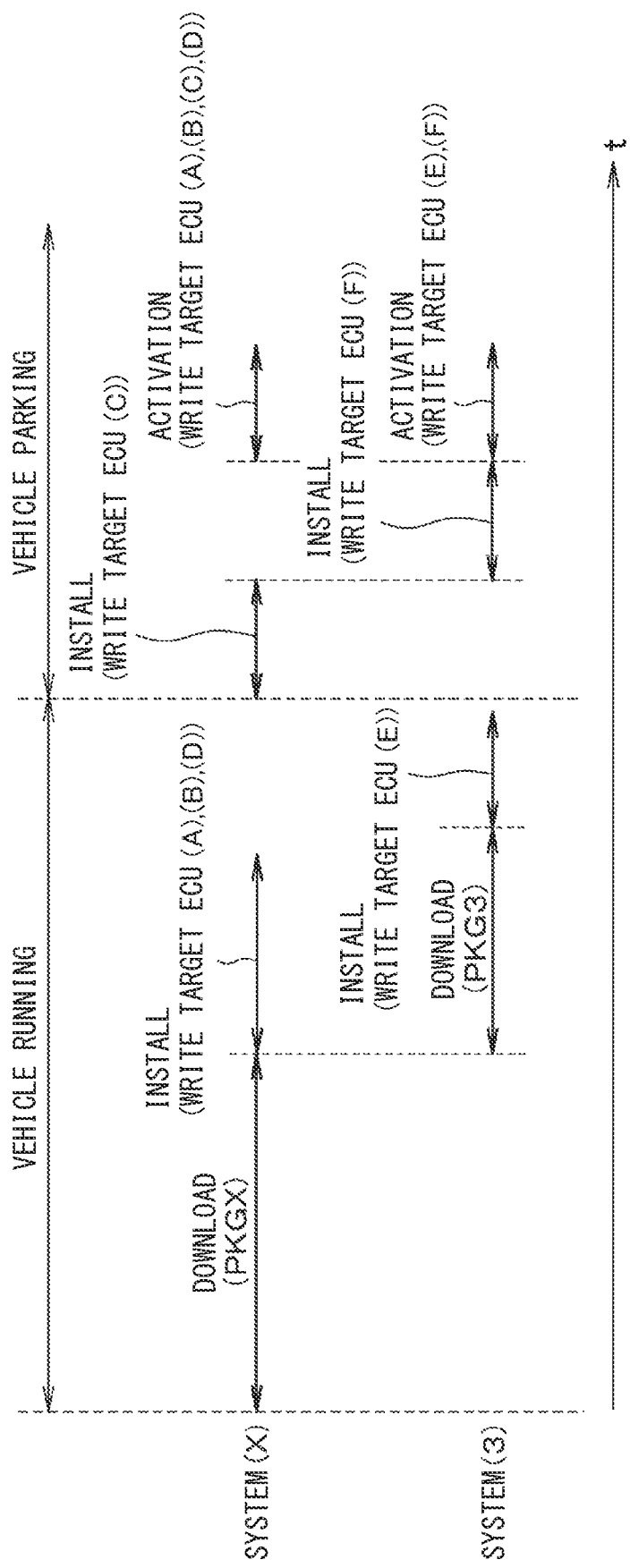
FIG. 11 is a diagram showing a timing chart (No. 2)
Figure 12:
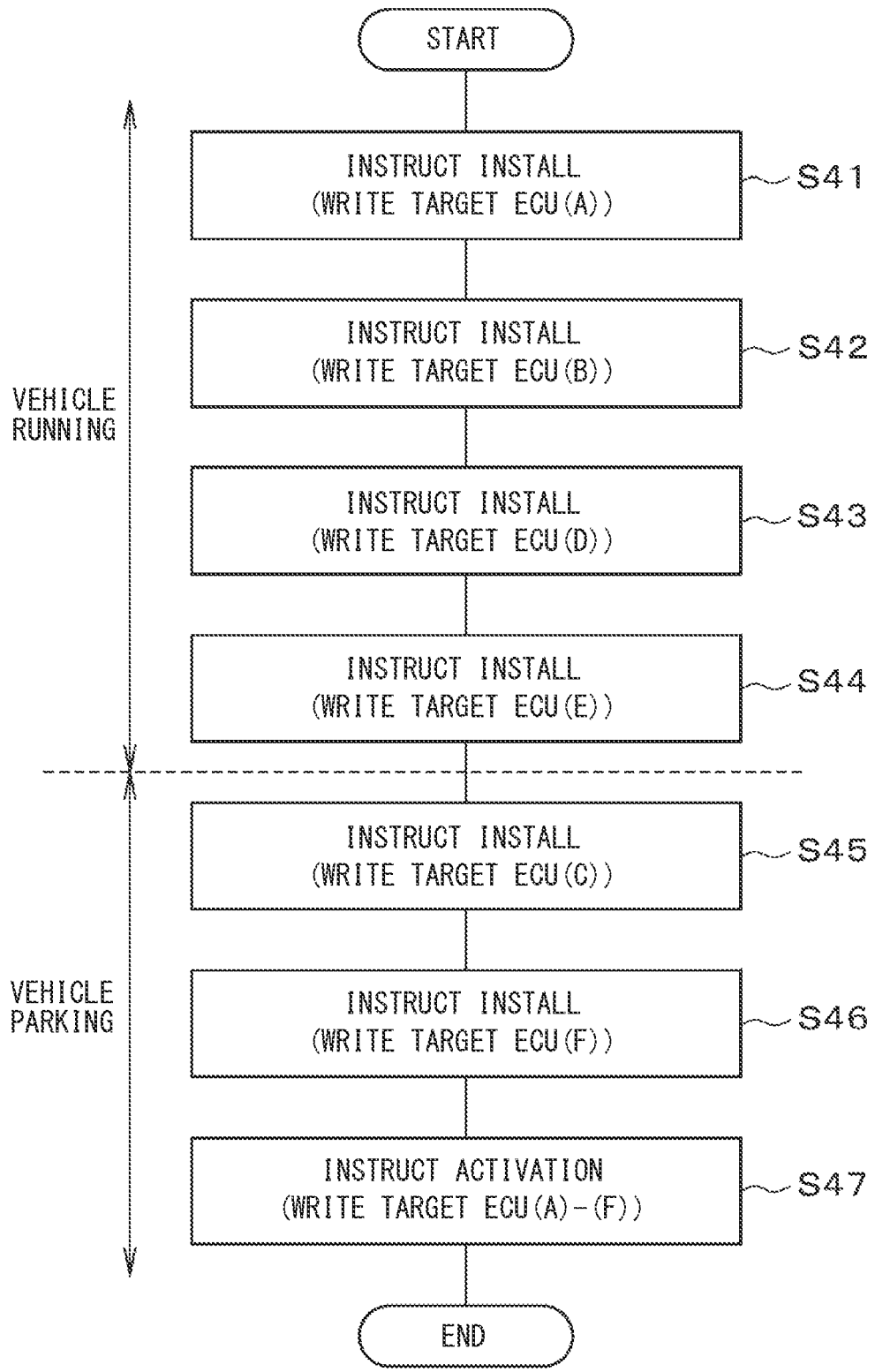
FIG. 12 is a diagram (No. 2) showing the flow of installation and activation.

When the dependency of the systems (1) to (3) corresponding to the packages downloaded from the center device 2 to the master device 3 is shown in FIG. 3, the control unit 9 firstly downloads the package X (PKGX) corresponding to the system (X) while the vehicle is running as shown in FIGS. 11 and 12. After that, the control unit 9 sequentially instructs the write target ECUs (A), (B) and (D) to install the update data in parallel with downloading the package 3 (PKG3) corresponding to the system (3) (at S41 to S43). After completing the download of the package 3 corresponding to the system (3), the control unit 9 sequentially instructs the write target ECU (E) to install the update data (at S44).

When the vehicle shifts from traveling to parking, the control unit 9 sequentially instructs the write target ECUs (C) and (F) to install the update data (at S45 to S46), and instructs the write target ECU (A) to (F) to activate the update data at the same time (at S47). That is, the control unit 9 instructs the write target ECUs (A) to (D) involved in the system (X) and the write target ECUs (E) to (F) involved in the system (3) to activate the update data at the same time. In the examples of FIGS. 11 and 12, the system (X) corresponds to the first system, the write target ECUs (A) to (D) correspond to the first write target electronic control device, and the system (3) corresponds to the second system, and the write target ECUs (E) to (F) correspond to the second write target electronic control device.

As shown in FIG. 13, for example, the software version of the write target ECUs (A) and (B) has been upgraded from "1.0" to "1.1", the software version of the write target ECU (C) has been upgraded from "1.0" to "1.2", and the software version of the write target ECU (D) has been upgraded from "1.1" to "1.2", so that the system (X) is upgraded. And, the software version of the write target ECUs (E) and (F) is upgraded from "2.0" to "2.1", so that the system (3) is upgraded. Thus, the system (X) and the system (3) are upgraded at the same time.

The above is an example of the case where two systems are upgraded at the same time by including two packages in one campaign information, but the number of packages included in one campaign information may be arbitrary and the number of systems to be upgraded at the same time may be arbitrary. Further, the number of write target ECUs 4 involved in one system may be also arbitrary.

Figure 14:
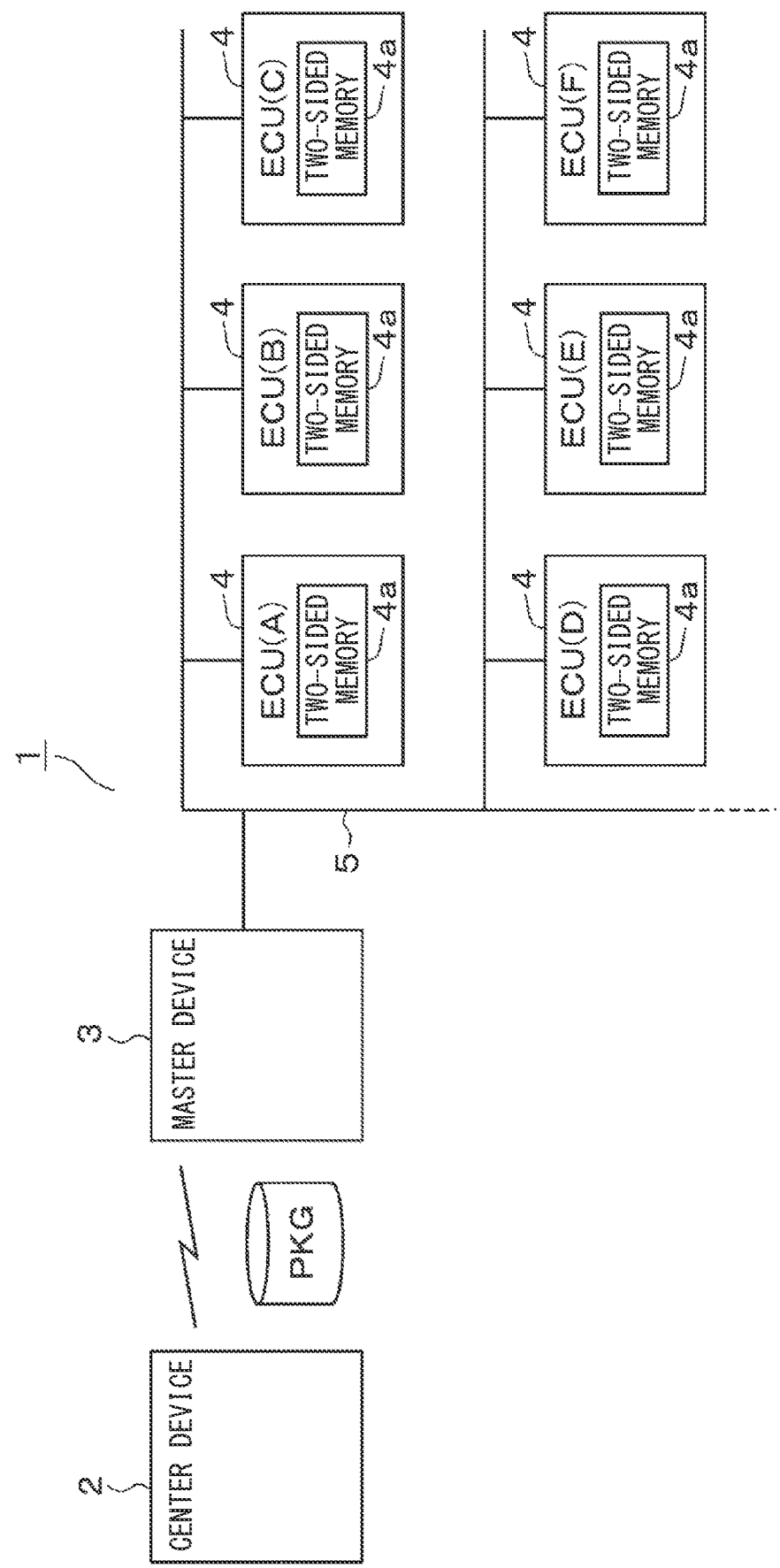
FIG. 14 is a diagram showing a memory configuration of an ECU.
Figure 15:
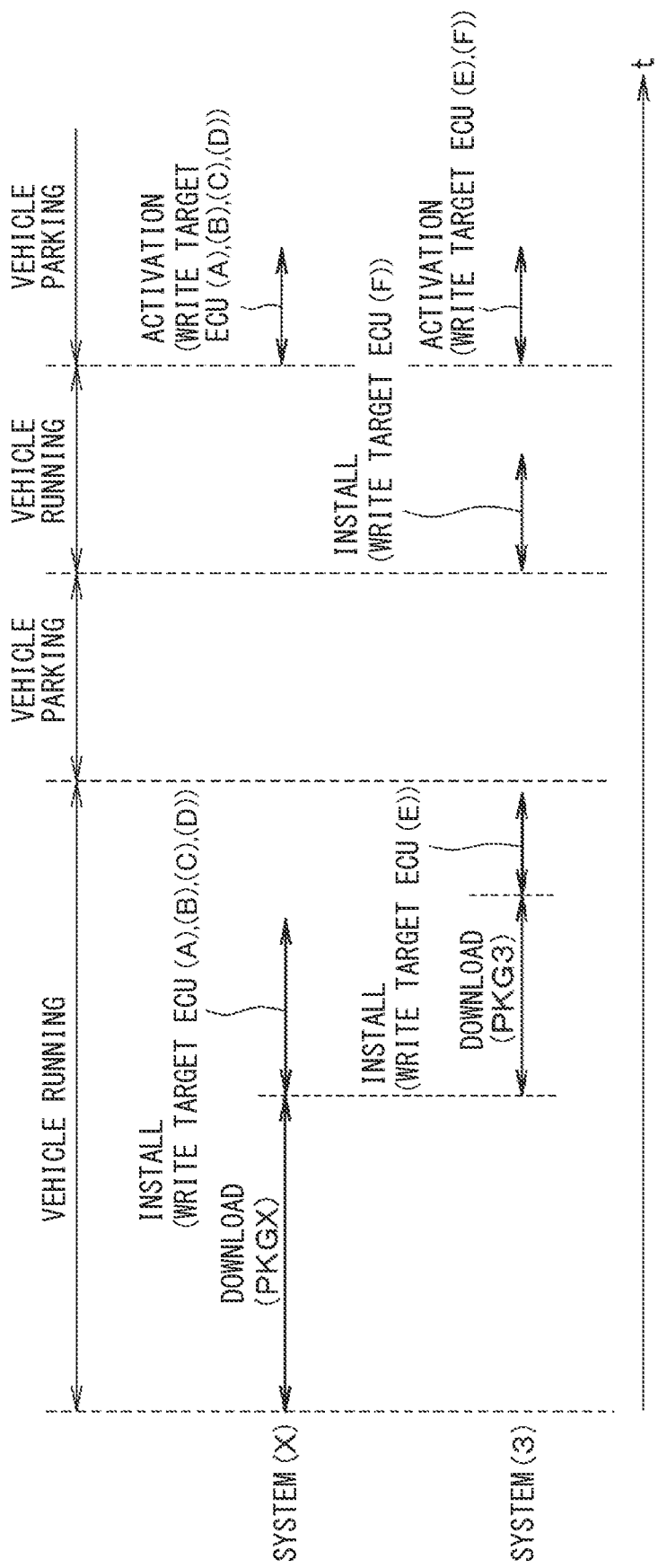
FIG. 15 is a diagram showing a timing chart (No. 3).

Next, as shown in FIG. 14, a case where the write target ECUs (A) to (F) have a two-sided memory 4a will be described. In this case, as shown in FIG. 15, the control unit 9 first downloads the package X corresponding to the system (X) while the vehicle is running. After that, the control unit 9 sequentially instructs the write target ECUs (A) to (D) to install the update data in parallel with downloading the package 3 corresponding to the system (3). After completing the download of the package 3 corresponding to the system (3), the control unit 9 sequentially instructs the write target ECUs (E) and (F) to install the update data. Here, for example, if the vehicle shifts from running to parking immediately after receiving the install completion notification from the write target ECU (E), the control unit 9 stops the install of the update data and causes the write target ECU (F) not to install the update data. Since the control unit 9 has not completed the install of the update data in the write target ECU (F), the control unit 9 does not instruct the activation of the update data. That is, even when the control unit 9 has completed the install of the update data in the write target ECUs (A) to (D) involved in the system (X), if the install of the update data in any of the write target ECUs involved in the system (3) has not been completed, the control unit 9 does not instruct the activation of the update data even in a case where the vehicle is parked.

In this case, it is assumed that the user is notified of the message "The vehicle cannot be driven for N minutes because the new program is being activated from now on" at the start of activation, and the activation is executed. If the system (X) and the system (3) are instructed to activate the update data at different timings, it is necessary to notify the above message each time, and there is a period during which the vehicle cannot be operated by activation each time. On the other hand, when the system (X) and the system (3) are instructed the activation of the update data at the same timing, the above message needs to be notified only once, and the period during which the vehicle cannot be operated by the activation is shortened compared with a case where the activation is instructed at different timings.

In the configuration described above, the control unit 9 has a configuration in which a plurality of packages are sequentially downloaded from the center device 2 in the download process, but since there is no dependency on the packages as the download target as described above, a plurality of packages may be downloaded from the device 2 in parallel. In the example of FIG. 2, the package 1 corresponding to the system (1) and the package 2 corresponding to the system (2) may be downloaded in parallel. In the example of FIG. 3, the package X corresponding to the system (X) and the package 3 corresponding to the system (3) may be downloaded in parallel.

As described above, according to the present embodiment, the following effects can be obtained.

In the master device 3, after the install of the update data is completed in all the write target ECUs 4 corresponding to the first system and all the write target ECUs 4 corresponding to the second system, the activation of the update data is instructed in all the write target ECUs 4 corresponding to the first system and all the write target ECUs 4 corresponding to the second system at the same timing. If multiple systems are instructed to activate the update data at different timings and updated, the vehicle may not be able to operate each time, but since the activation of the update data is instructed and updated at the same timing, this makes it possible to appropriately reduce the situation in which the vehicle cannot be operated.

In the master device 3, when the vehicle shifts from running to parking, the activation of the update data is instructed for all write target ECUs 4 corresponding to the first system and all write target ECUs 4 corresponding to the second system at the same timing. The program can be updated at the timing when the vehicle changes from running to parking.

In the master device 3, in parallel with downloading the package from the center device 2, the installation of the update data is instructed to the write target ECU 4. Compared with the configuration in which the installation of the update data is instructed to the write target ECU 4 after the download of the package is completed, the time required from the start of the download of the package to the completion of the activation can be shortened.

In the master device 3, a plurality of packages are downloaded from the center device 2 in parallel. It is possible to shorten the time from the start to the completion of downloading a plurality of packages from the center device 2.

In the master device 3, for the write target ECU 4 having a two-sided memory configuration, the write target ECU 4 having the two-sided memory configuration is instructed to install the update data while the vehicle is running or parked. By instructing the installation of update data while driving, the installation of update data is not instructed while the vehicle is parked, and the activation of update data is promptly instructed when the vehicle shifts from driving to parking.

In the master device 3, for the write target ECU 4 having a one-sided memory configuration, the write target ECU 4 having the one-sided memory configuration is instructed to install the update data while the vehicle is parked. It is possible to ensure safety such as vehicle control without instructing the installation of update data while the vehicle is traveling.

In the master device 3, the update data is deleted after the activation is completed in all the write target ECUs 4. For example, if the activation is not completed normally, it is assumed that the installation will be instructed again, but by keeping the updated data without deleting it until the activation is completed, it is possible to avoid the situation going back to the download.

In the master device 3, the configuration information is notified to the center device 2 after the activation is completed in all the write target ECUs 4. By notifying the center device 2 of the configuration information, it is possible to match the version of the system or ECU 4 managed by the center device 2 with the version of the actual system or ECU 4 on the vehicle side.

Although the present disclosure has been described in accordance with the embodiments, it is understood that the present disclosure is not limited to the embodiments and structures described above. The present disclosure encompasses various modification examples or variations within the scope of equivalents. Various combinations or forms as well as other combinations or forms including only one element, one or more elements, or one or less elements, fall within the scope or the spirit of the present disclosure.

The control unit and the method according to the present disclosure may be achieved by a dedicated computer provided by constituting a processor and a memory programmed to execute one or more functions embodied by a computer program. Alternatively, the control unit and the method according to the present disclosure may be achieved by a dedicated computer provided by constituting a processor with one or more dedicated hardware logic circuits. Alternatively, the control unit and the method according to the present disclosure may be achieved using one or more dedicated computers constituted by a combination of the processor and the memory programmed to execute one or more functions and the processor with one or more hardware logic circuits. The computer program may also be stored on a computer readable and non-transitory tangible recording medium as instructions executed by a computer.

The master device 3 may have a DCM (Data Communication Module) that stores packages downloaded from the center device 2 and a CGW (Central Gate Way) that instructs the installation and activation of update data.

An external storage device may be provided separately from the master device 3, and the package distributed from the center device 2 to the master device 3 may be temporarily stored in the external storage device.

In the center device 2, a configuration in which packages are combined to generate and distribute a campaign information so that a dependency does not occur is illustrated. alternatively, by providing the master device 3 with a function for determining a dependency, the master device 3 may have a configuration for determining the dependency of the package downloaded from the center device 2.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A master device comprising a processor and memory configured to implement:
a download execution unit that downloads a first package corresponding to a first system and a second package corresponding to a second system from a center device;
an update data extraction unit that extracts an update data from the first package and the second package downloaded by the download execution unit;
an install instruction unit that instructs an electronic control device as a write target to install the update data extracted by the update data extraction unit; and
an activation instruction unit that instructs the electronic control device as the write target to activate the update data after the install of the update data is completed in the electronic control device as the write target; and
a configuration information notification unit that notifies the center device of configuration information that represents a version of the electronic control device and a version of a vehicle system;
wherein:
the activation instruction unit instructs all electronic control devices as a first write target and all electronic control devices as a second write target at a same timing to activate the update data after completing the install of the update data in all the electronic control devices of the first write target corresponding to the first system and all the electronic control devices of the second write target corresponding to the second system;

the install instruction unit completes the install of the update data in all the electronic control devices as the second write target corresponding to the second system after completing the install of the update data in all the electronic control devices as the first write target corresponding to the first system before activating the update data in the first write target corresponding to the first system; and the configuration information notification unit notifies the center device of the configuration information after completing activation in all electronic control devices as the first write target and all electronic control devices as the second write target.

2. The master device according to claim 1, wherein:
the activation instruction unit instructs all the electronic control devices as the first write target and all the electronic control devices as the second write target at the same timing to activate the update data when a vehicle state is changed to a predetermined state after completing the install of the update data in all the electronic control devices of the first write target corresponding to the first system and all the electronic control devices of the second write target corresponding to the second system.

3. The master device according to claim 1, wherein:
the install instruction unit instructs the electronic control device as the write target to install the update data in parallel with the download execution unit downloading the first package and the second package from the center device.

4. The master device according to claim 1, wherein:
the download execution unit downloads the first package and the second package from the center device in parallel.

5. The master device according to claim 1, wherein:
the install instruction unit instructs the electronic control device as the write target having a two-sided memory configuration to install the update data while a vehicle is running or parked when the electronic control device as the write target has the two-sided memory configuration.

6. The master device according to claim 1, wherein:
the install instruction unit instructs the electronic control device as the write target having a one-sided memory configuration to install the update data while a vehicle is parked when the electronic control device as the write target has the one-sided memory configuration.

7. The master device according to claim 1, wherein:
the processor and memory are further configured to implement an update data deletion unit that deletes the update data; and
the update data deletion unit deletes the update data extracted by the update data extraction unit after completing an activation in all electronic control devices as the first write target and all electronic control devices as the second write target.

8. The master device according to claim 1, wherein:
the download execution unit downloads the first package and the second package from the center device under a condition that campaign information corresponding to the first package and the second package is received, and a consent operation for update using the first package and the second package.

9. The master device according to claim 1, wherein:
the center device generates the first system including a plurality of systems which have a dependent relation dependent to each other; and
the center device generates the second system having an independent relation between the first system and the second system independent from each other.

10. The master device according to claim 1, wherein:
the vehicle system corresponds to at least one of an accelerator control system, a brake control system, and a steering control system; and
each vehicle system includes one or more electronic control devices.

11. The master device according to claim 1, wherein the vehicle system includes the first system and the second system.

12. A data distribution system comprising:
a center device that distributes a first package corresponding to a first system and a second package corresponding to a second system to a master device; a master device that downloads the first package and the second package from the center device and transfers an update data extracted from a downloaded package to an electronic control device as a write target; and the electronic control device that writes the update data transferred from the master device to a memory, wherein:

the center device includes a processor and memory configured to implement:
a package storage unit that stores the first package and the second package generated so as to have an independent relation between the first system and the second system independent from each other; and
a package distribution unit that reads the first package and the second package stored in the package storage unit and distributes a read first package and a read second package to the master device;

the master device includes a processor and memory configured to implement:
a download execution unit that downloads the first package and the second package from the center device;
an update data extraction unit that extracts an update data from the first package and the second package downloaded by the download execution unit;
an install instruction unit that instructs an electronic control device as a write target to install the update data extracted by the update data extraction unit; and
an activation instruction unit that instructs the electronic control device as the write target to activate the update data after the install of the update data is completed in the electronic control device as the write target; and
a configuration information notification unit that notifies the center device of configuration information that represents a version of the electronic control device and a version of a vehicle system;

wherein:
the activation instruction unit instructs all electronic control devices as a first write target and all electronic control devices as a second write target at a same timing to activate the update data after completing the install of the update data in all the electronic control devices of the first write target corresponding to the first system and all the electronic control devices of the second write target corresponding to the second system;

the install instruction unit completes the install of the update data in all the electronic control devices as the second write target corresponding to the second system after completing the install of the update data in all the electronic control devices as the first write target corresponding to the first system before activating the update data in the first write target corresponding to the first system; and the configuration information notification unit notifies the center device of the configuration information after completing activation in all electronic control devices as the first write target and all electronic control devices as the second write target.

13. The data distribution system according to claim 12, wherein:

the processor and memory of the center device are further configured to implement: a package generation unit that generates a package to set a plurality of systems having a dependent relation therebetween as one system when the plurality of systems having a dependent relation dependent to each other are an update target.

14. The data distribution system according to claim 12, wherein:

the center device generates the first system including a plurality of systems which have a dependent relation dependent to each other.

15. A non-transitory tangible computer readable storage medium comprising instructions being executed by a computer, the instructions causing a control unit of a master device, which downloads a first package corresponding to a first system and a second package corresponding to a second system from a center device, and extracts an update data from a downloaded first package and a downloaded second package, to execute:

an install instruction procedure for instructing all electronic control devices as a first write target corresponding to the first system and all electronic control devices as a second write target corresponding to the second system to install the update data;

an activation instruction procedure for instructing all the electronic control devices as the first write target and all the electronic control devices as the second write target to activate the update data at a same timing after completing the install of the update data in all the electronic control devices as the first write target corresponding to the first system and all the electronic control devices as the second write target corresponding to the second system;

a configuration information notification procedure for notifying the center device of configuration information that represents a version of the electronic control device and a version of a vehicle system;

wherein:

the install instruction procedure includes completing the install of the update data in all the electronic control devices as the second write target corresponding to the second system after completing the install of the update data in all the electronic control devices as the first write target corresponding to the first system before activating the update data in the first write target corresponding to the first system; and the configuration information notification procedure includes notifying the center device of the configuration information after completing activation in all electronic control devices as the first write target and all electronic control devices as the second write target.

* * * * *